US012576675B2

(12) United States Patent
Ishigaki

(10) Patent No.: US 12,576,675 B2
(45) Date of Patent: Mar. 17, 2026

(54) TIRE

(71) Applicant: Sumitomo Rubber Industries, Ltd.,
Kobe (JP)

(72) Inventor: Yuichi Ishigaki, Kobe (JP)

(73) Assignee: **SUMITOMO RUBBER
INDUSTRIES, LTD.**, Kobe (JP)

( * ) Notice: Subject to any disclaimer, the term of this
patent is extended or adjusted under 35
U.S.C. 154(b) by 0 days.

(21) Appl. No.: 18/231,252

(22) Filed: Aug. 8, 2023

(65) Prior Publication Data

US 2024/0051350 A1     Feb. 15, 2024

(30) Foreign Application Priority Data

Aug. 12, 2022     (JP) ................................. 2022-128858

(51) Int. Cl.
B60C 15/06          (2006.01)

(52) U.S. Cl.
CPC .......... B60C 15/0628 (2013.01); B60C 15/06
(2013.01); *B60C 2015/0617* (2013.01); *B60C*
*2015/0678* (2013.01)

(58) Field of Classification Search
CPC .... B60C 2015/0614; B60C 2015/0617; B60C
2015/0621; B60C 2015/0625; B60C
15/06; B60C 15/0603; B60C 15/0607
See application file for complete search history.

(56) References Cited

U.S. PATENT DOCUMENTS

| 5,622,576 A | 4/1997 | Lobb et al. |
| 2022/0410639 A1 | 12/2022 | Ishigaki et al. |

FOREIGN PATENT DOCUMENTS

| EP | 3112189 B1 * | 11/2019 | ......... B60C 15/0054 |
| EP | 4112288 A1 | 1/2023 | |
| JP | 2019-084863 A | 6/2019 | |
| JP | 2020-026171 A | 2/2020 | |

OTHER PUBLICATIONS

Extended European search report issued on Mar. 21, 2024, in corresponding European patent Application No. 23189721.6, 9 pages.

* cited by examiner

*Primary Examiner* — Justin R Fischer
(74) *Attorney, Agent, or Firm* — XSENSUS LLP

(57)          ABSTRACT
A tire can include a pair of beads, a carcass, a pair of protective rubber layers, and a pair of reinforcing rubber layers. A carcass ply of the carcass can include a ply body and a pair of turned-up portions. Each reinforcing rubber layer can be between the turned-up portion and the protective rubber layer. An outer end of an apex of each bead can be between an outer end and an inner end of the reinforcing rubber layer in a radial direction. A thickness of the protective rubber layer in a zone from a rim contact end to the outer end of the reinforcing rubber layer can be small at a center portion in the radial direction of the reinforcing rubber layer and can be large at another portion.

16 Claims, 4 Drawing Sheets

TIRE

CROSS-REFERENCE TO RELATED APPLICATION(S)

The present application claims priority to Japanese patent application JP 2022-128858, filed on Aug. 12, 2022, the entire content of which is incorporated herein by reference in its entirety.

BACKGROUND

Field

The present disclosure relates to a tire.

Each bead of a tire can includes a core and an apex. In order to improve durability, for example, as disclosed in Japanese Laid-Open Patent Publication No. 2020-026171, it is considered to reduce the size of each apex and provide a reinforcing rubber layer on the axially outer side of the apex with a turned-up portion of a carcass ply therebetween. In this case, in order to ensure the stiffness of a bead portion, the reinforcing rubber layer is formed from a hard cross-linked rubber.

The tire is fitted onto a rim, and the interior of the tire is filled with air. Accordingly, the tire expands. Therefore, strain is generated on the outer surface of the tire whose internal pressure is adjusted.

The tire includes a protective rubber layer as a component forming each side surface thereof. The protective rubber layer includes a clinch which comes into contact with the rim, and a sidewall which is located radially outward of the clinch. The above-described reinforcing rubber layer is covered with the protective rubber layer. If the thickness of the protective rubber layer is set based on the same concept as in the conventional art, the mass of the tire increases.

The reinforcing rubber layer is harder than the protective rubber layer. Therefore, if the thickness of the protective rubber layer is set based on the same concept as in the conventional art, the stiffness of a rubber layer located outward of a carcass is increased at a portion including the reinforcing rubber layer. Therefore, there is a concern that the difference between a portion having larger surface strain and a portion having smaller surface strain may be increased as compared to that in a tire in which no reinforcing rubber layer is provided. It is assumed that strain is concentrated in a radially outer portion from the center position of the reinforcing rubber layer, and in this case, durability may be decreased.

SUMMARY

A tire according to the present disclosure can include: a pair of beads; a carcass extending on and between the pair of beads; a pair of protective rubber layers each located axially outward of the carcass and forming a side surface of the tire; and a pair of reinforcing rubber layers each located axially outward of the bead. The carcass can include a carcass ply including a carcass cord, and the carcass ply includes a ply body extending between the pair of beads, and a pair of turned-up portions each connected to the ply body and turned up around the bead. Each of the reinforcing rubber layers can be located between the turned-up portion and the protective rubber layer. Each of the beads can include a core and an apex located radially outward of the core. An outer end of the apex can be located between an outer end and an inner end of the reinforcing rubber layer in a radial direction. A thickness of the protective rubber layer in a zone from a rim contact end to the outer end of the reinforcing rubber layer can be small at a center portion in the radial direction of the reinforcing rubber layer and can be large at another portion.

DETAILED DESCRIPTION

Figure 1:
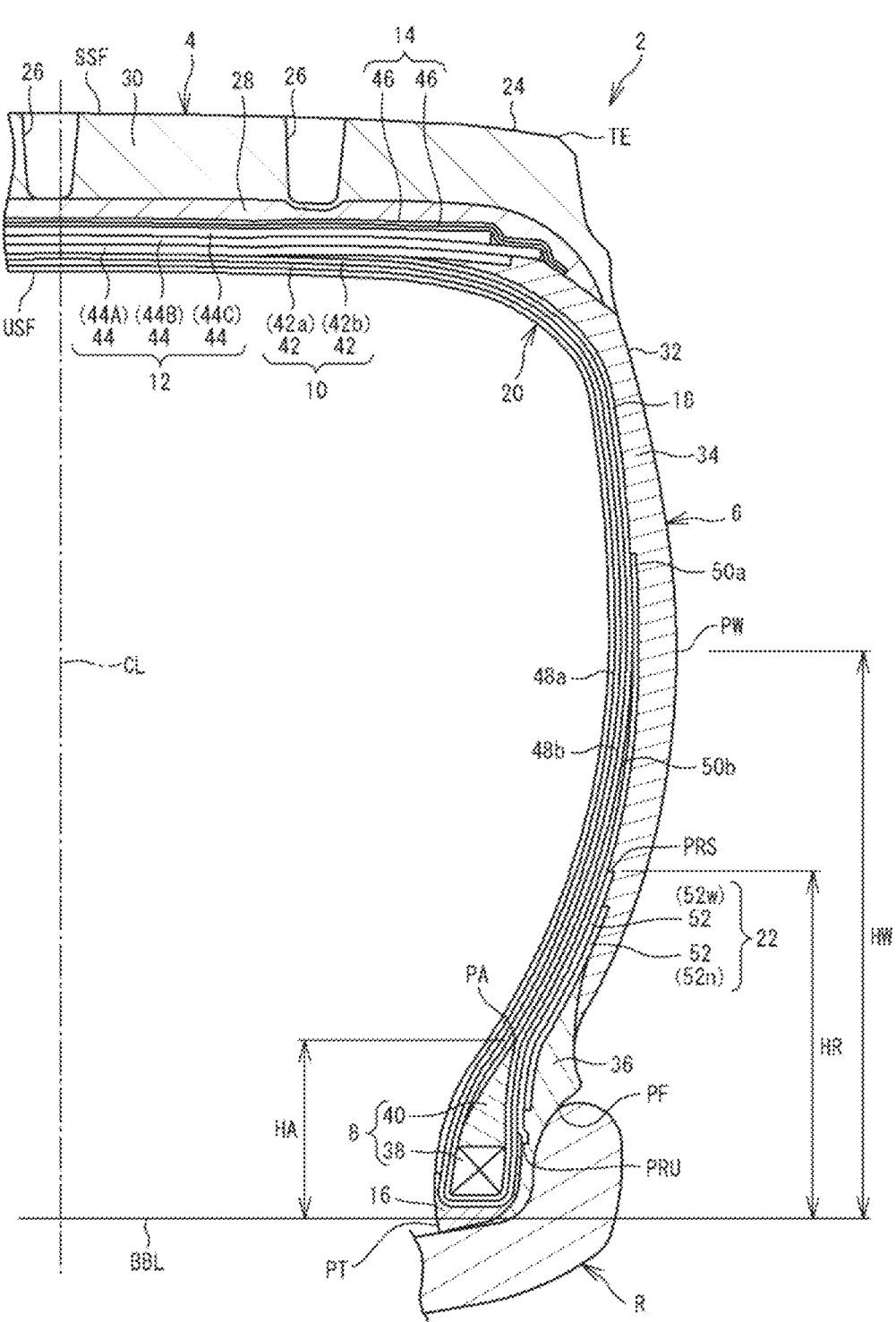
FIG. 1 is a cross-sectional view showing a part of a tire according to an embodiment of the present disclosure.

Embodiments of the present disclosure have been made in view of such circumstances described in the Background section.

An object of one or more embodiments of the present disclosure, among one or more objects, can be to provide a tire that can improve the degree of achievement of both durability and mass reduction.

According to one or more embodiments of the present disclosure, a tire that can improve the degree of achievement of both durability and mass reduction can be obtained.

A tire according to embodiments of the present disclosure can be fitted on a rim. The interior of the tire can be filled with air to adjust the internal pressure of the tire. The tire fitted on the rim may also be referred to as tire-rim assembly. The tire-rim assembly can include the rim and the tire fitted on the rim.

In the present disclosure, a state where a tire is fitted on a standardized rim, the internal pressure of the tire is adjusted to a standardized internal pressure, and no load is applied to the tire can be regarded as a standardized state.

A state where the tire is fitted on a standardized rim, the internal pressure of the tire is adjusted to 30 kPa, and no load is applied to the tire can be regarded as a reference state.

In the present disclosure, unless otherwise specified, the dimensions and angles of each component of the tire are measured in the standardized state.

The dimensions and angles of each component in a meridian cross-section of the tire can be measured in a cross-section of the tire obtained by cutting the tire along a plane including a rotation axis. In this measurement, the tire can be set such that the distance between right and left beads is equal to the distance between the beads in the tire that is fitted on the standardized rim.

The standardized rim can be regarded as a rim specified in a standard on which the tire is based. The "standard rim" in the JATMA standard, the "Design Rim" in the TRA standard, and the "Measuring Rim" in the ETRTO standard can be regarded as standardized rims.

The standardized internal pressure can mean an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard can be regarded as standardized internal pressures.

The standardized load can mean a load specified in the standard on which the tire is based. The "maximum load capacity" in the JATMA standard, the "maximum value"

recited in the "TIRE LOAD LIMITS AT VARIOUS COLD INFLATION PRESSURES" in the TRA standard, and the "LOAD CAPACITY" in the ETRTO standard can be regarded as standardized loads.

In the present disclosure, a tread portion of the tire can be a portion of the tire that comes into contact with a road surface. A bead portion can be a portion of the tire that is fitted to a rim. A sidewall portion can be a portion of the tire that extends between the tread portion and the bead portion. The tire can include a tread portion, a pair of bead portions, and a pair of sidewall portions as portions thereof.

For one or more embodiments of the present disclosure, a complex elastic modulus of a component formed from a crosslinked rubber, of the components included in the tire, can be measured according to the standards of JIS K6394. The measurement conditions can be as follows.

Initial strain=10%
Dynamic strain=±1%
Frequency=10 Hz
Mode=stretch mode
Temperature=70° C.

In this measurement, a test piece (length 40 mm×width 4 mm×thickness 1 mm) can be sampled from the tire. The longitudinal direction of the test piece is caused to coincide with the circumferential direction of the tire. When a test piece cannot be sampled from the tire, a test piece is sampled from a sheet-shaped crosslinked rubber obtained by pressurizing and heating a rubber composition, which is used for forming the component to be measured, at a temperature of 170° C. for 12 minutes.

For one or more embodiments of the present disclosure, the complex elastic modulus can be represented as a complex elastic modulus at 70° C.

OUTLINE OF EMBODIMENTS

Exemplary Configuration 1

A tire according to an aspect of the present disclosure can include: a pair of beads; a carcass extending on and between the pair of beads; a pair of protective rubber layers each located axially outward of the carcass and forming a side surface of the tire; and a pair of reinforcing rubber layers each located axially outward of the bead, wherein the carcass includes a carcass ply including a carcass cord, the carcass ply includes a ply body extending between the pair of beads, and a pair of turned-up portions each connected to the ply body and turned up around the bead, each of the reinforcing rubber layers is located between the turned-up portion and the protective rubber layer, each of the beads includes a core and an apex located radially outward of the core, an outer end of the apex is located between an outer end and an inner end of the reinforcing rubber layer in a radial direction, and a thickness of the protective rubber layer in a zone from a rim contact end to the outer end of the reinforcing rubber layer is small at a center portion in the radial direction of the reinforcing rubber layer and is large at another portion.

By shaping the tire as described above, the stiffness of a rubber layer located outward of the carcass can be inhibited from being increased at a portion including the reinforcing rubber layer. Strain generated at the side surface of the tire can be effectively dispersed, so that concertation of strain on a specific portion is suppressed. The tire can have improved durability. The volume of the protective rubber layer can be reduced, so that the tire can have a reduced mass. The tire can improve the degree of achievement of both durability and mass reduction.

Exemplary Configuration 2

Further to the tire described in [Configuration 1] above, the protective rubber layer can have a reference thickness T0 at a maximum width position, can have an outer end thickness T1 at the outer end of the reinforcing rubber layer, can have a minimum thickness T2 at the center portion in the radial direction of the reinforcing rubber layer, and can have a contact thickness T3 at the rim contact end. The reinforcing rubber layer can have a contact thickness TB at the rim contact end, the minimum thickness T2 can be smaller than the outer end thickness T1, the outer end thickness T1 can be the same as or similar to the reference thickness T0, and a total thickness T3B of the contact thickness T3 and the contact thickness TB can be larger than the reference thickness T0.

By shaping the tire as described above, the stiffness of the rubber layer located outward of the carcass can be effectively inhibited from being increased at the portion including the reinforcing rubber layer. Strain generated at the side surface of the tire can be effectively dispersed, so that concertation of strain on a specific portion can be suppressed. The tire can have improved durability. The volume of the protective rubber layer can be reduced, so that the tire can have a reduced mass.

Exemplary Configuration 3

Further to the tire described in [Configuration 1] or [Configuration 2] above, a ratio (T2/T1) of the minimum thickness T2 to the outer end thickness T1 can be not less than 0.5, and a ratio (T3B/T0) of the total thickness T3B to the reference thickness T0 can be not less than 3.0 and not greater than 5.0.

By shaping the tire as described above, the tire can have further improved durability while achieving mass reduction.

Exemplary Configuration 4

Further to the tire described in any one of [Configuration 1] to [Configuration 3] above, the reinforcing rubber layer can have an intermediate thickness TA at a position at which the protective rubber layer has the minimum thickness T2, and a ratio (T2A/T1) of a total thickness T2A of the minimum thickness T2 and the intermediate thickness TA to the outer end thickness T1 can be not less than 0.5 and not greater than 2.0.

By shaping the tire as described above, the tire can have further improved durability while achieving mass reduction.

Exemplary Configuration 5

Further to the tire described in any one of [Configuration 1] to [Configuration 4] above, in a reference state where the tire is fitted on a standardized rim and an internal pressure of the tire is adjusted to 30 kPa, a contour line of the side surface can include a first curved portion located radially outward of a maximum width position and bulging outwardly, a second curved portion located radially inward of the maximum width position and bulging outwardly, and an inversely curved portion located radially inward of the second curved portion and recessed inwardly, where the first curved portion, the second curved portion, and the inversely curved portion are each represented by an arc. A radius Rr of the arc representing the inversely curved portion can be smaller than a radius Rj of the arc representing the first curved portion, and a ratio (Rr/Rj) of the radius Rr of the arc representing the inversely curved portion, to the radius Rj of the arc representing the first curved portion, can be not less than 0.50.

By shaping the tire as described above, the stiffness of the rubber layer located outward of the carcass can be effectively inhibited from being increased at the portion including the reinforcing rubber layer. Strain generated at the side surface of the tire can be effectively dispersed, so that concertation of strain on a specific portion can be suppressed. The tire can have improved durability. The volume of the protective rubber layer can be reduced, so that the tire can have a reduced mass. Surface strain generated at the inversely curved portion can be inhibited from being excessively increased, so that good durability is maintained.

Details of Embodiments of Present Disclosure

FIG. 1 shows a tire 2 according to an embodiment of the present disclosure. The tire 2 can be mounted to a vehicle such as a small truck. According to one or more embodiments, the tire 2 may be referred to as small truck tire.

FIG. 1 shows a part of a cross-section (hereinafter, referred to as meridian cross-section) of the tire 2 taken along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2.

Figure 2:
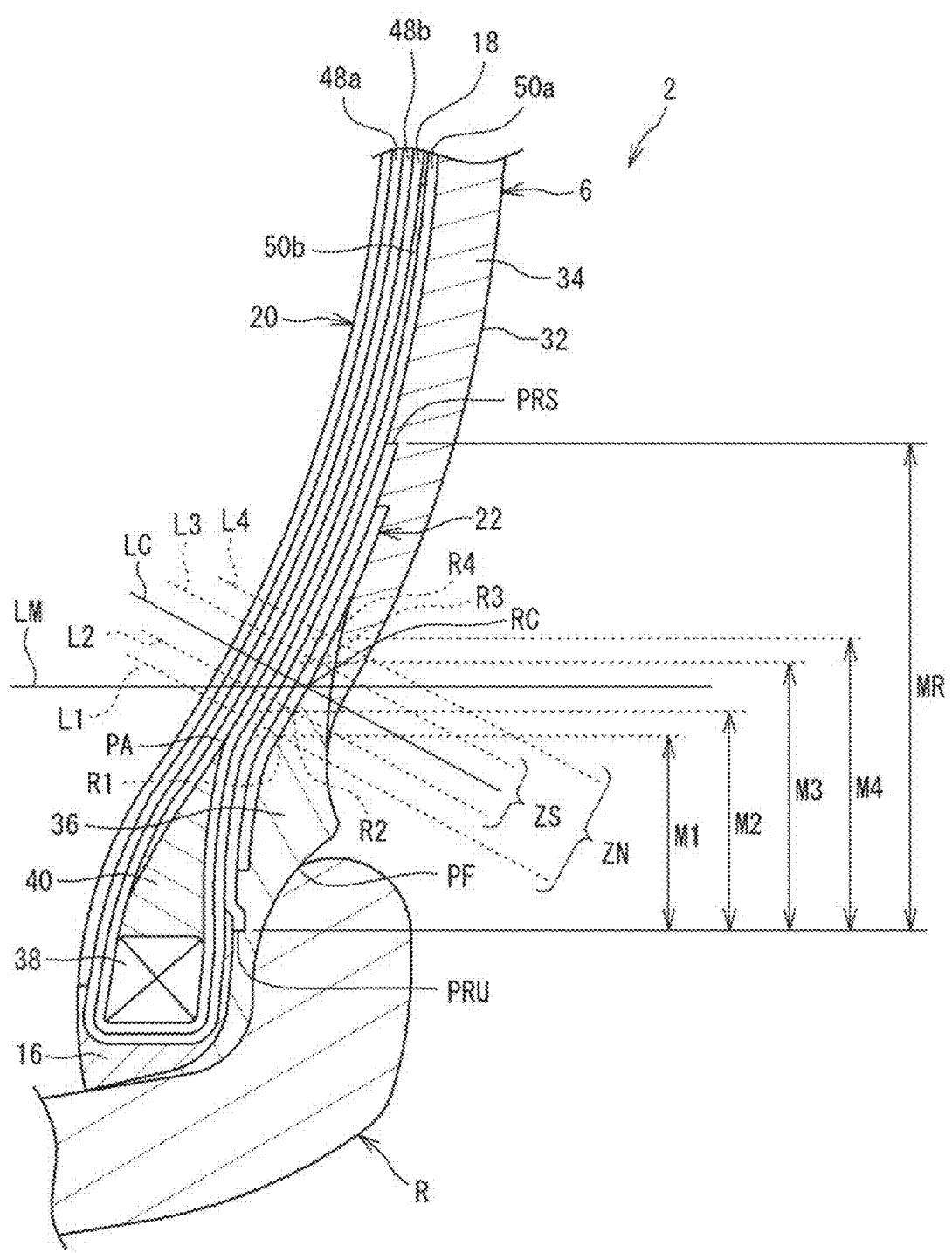
FIG. 2 is a cross-sectional view showing a bead portion of the tire.

FIG. 2 shows a part of the cross-section shown in FIG. 1. FIG. 2 shows a bead portion of the tire 2.

In FIGS. 1 and 2, the tire 2 is in a state where the tire 2 is fitted on a rim R (standardized rim).

Figure 4:
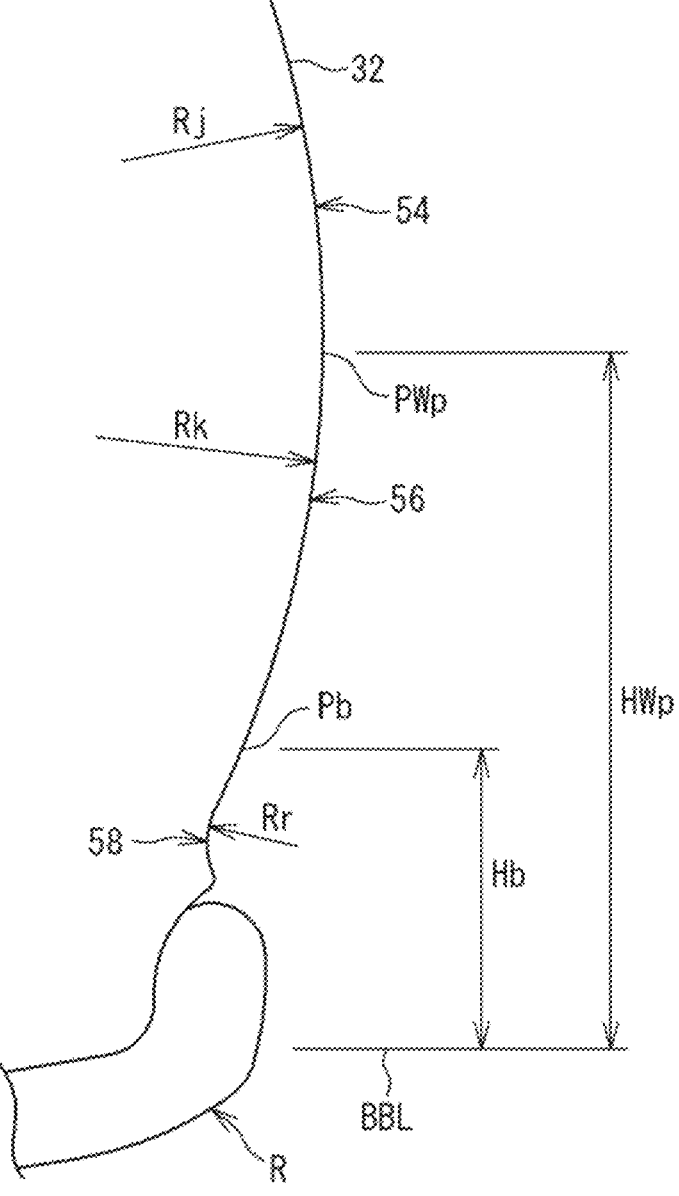
FIG. 4 is a cross-sectional view showing a part of a contour of an outer surface of the tire.

An alternate long and short dash line CL extending in the radial direction in FIG. 1 represents the equator plane of the tire 2. A solid line BBL extending in the axial direction in FIGS. 1 and 4 is a bead base line. The bead base line BBL is a line that defines the rim diameter (see JATMA or the like) of the rim R.

A surface SF of the tire 2 includes an inner surface USF and an outer surface SSF. Although not described in detail, the inner surface USF can be shaped by a bladder (or a rigid core). The outer surface SSF can be shaped by a mold. A boundary between the inner surface USF and the outer surface SSF can be regarded as a toe PT.

The tire 2 can include a tread 4, a pair of protective rubber layers 6, a pair of beads 8, a carcass 10, a belt 12, a band 14, a pair of chafers 16, a pair of insulations 18, an inner liner 20, and a pair of reinforcing rubber layers 22.

The tread 4 can be located radially outward of the carcass 10. The tread 4 can come into contact with a road surface at a tread surface 24 thereof. Grooves 26 can be formed on the tread 4. The tread surface 24 can form a part of the outer surface SSF of the tire 2.

The tread 4 can include a base portion 28 and a cap portion 30 located radially outward of the base portion 28. The base portion 28 can be formed from a crosslinked rubber that has low heat generation properties. The cap portion 30 can be formed from a crosslinked rubber for which wear resistance and grip performance are taken into consideration. The cap portion 30 can include the tread surface 24.

In FIG. 1, reference character TE can represent an end of the tread surface 24. The tread surface 24 can form a part of the outer surface SSF. Of the outer surface SSF, a portion between the end TE of the tread surface 24 and the toe PT can be regarded as a side surface 32. The outer surface SSF can include the tread surface 24 and a pair of side surfaces 32.

Each protective rubber layer 6 can be located axially outward of the carcass 10. The protective rubber layer 6 can form a part of the side surface 32.

According to one or more embodiments of the present disclosure, the thickness of the protective rubber layer 6 can be measured along a normal line that is normal to the side surface 32. In the case where decorations such as patterns and letters are present on the side surface 32, the thickness of the protective rubber layer 6 can be measured along a normal line that is normal to a virtual side surface obtained on the assumption that the decorations are not present.

A position indicated by reference character PW can be regarded as an axially outer end (hereinafter, outer end PW) of the tire 2. In the case where decorations such as patterns and letters are present on the side surface 32, the outer end PW can be specified based on he above-described virtual side surface.

The tire 2 can have a maximum width at the outer end PW. The outer end PW can also be referred to as maximum width position. The distance in the axial direction from a first maximum width position PW to a second maximum width position PW in the tire 2 in the standardized state can be regarded as the cross-sectional width (see JATMA or the like) of the tire 2.

A length indicated by reference character HW can be the distance in the radial direction from the bead base line BBL to the maximum width position PW. The distance HW in the radial direction can also be referred to as radial height of the maximum width position PW.

The protective rubber layer 6 can include a sidewall 34 and a clinch 36.

The sidewall 34 can be connected to an end of the tread 4. The sidewall 34 can be located radially inward of the tread 4. The sidewall 34 can be formed from a crosslinked rubber for which cut resistance is taken into consideration. The sidewall 34 can include the above-described maximum width position PW. A complex elastic modulus of the sidewall 34 can be not less than 2.0 MPa and not greater than 6.0 MPa, for instance.

The clinch 36 can be located radially inward of the sidewall 34. The clinch 36 can come into contact with a flange of the rim R. The clinch 36 can be formed from a crosslinked rubber for which wear resistance is taken into consideration. The clinch 36 can be harder than the sidewall 34. A complex elastic modulus of the clinch 36 can be not less than 10 MPa and not greater than 15 MPa, for instance.

Each bead 8 can be located axially inward of the clinch 36. The bead 8 can have a ring shape. The bead 8 can include a core 38 and an apex 40.

The core 38 can extend in the circumferential direction. The core 38 can include a wire made of steel and wound in the circumferential direction. The apex 40 can be located radially outward of the core 38. The apex 40 can extend radially outward from the core 38. The apex 40 can be tapered outward. The apex 40 can be formed from a hard crosslinked rubber. A complex elastic modulus of the apex 40 can be not less than 60 MPa and not greater than 90 MPa.

A length indicated by reference character HA can be regarded as the distance in the radial direction from the bead base line BBL to an outer end PA of the apex 40. The distance HA in the radial direction can also be referred to as radial height of the apex 40.

The ratio (HA/HW) of the radial height HA of the apex 40 to the radial height HW of the maximum width position PW can be not less than 0.25 and not greater than 0.40, for instance.

The carcass 10 can be located inward of the tread 4 and the pair of protective rubber layers 6. The carcass 10 can extend on and between the pair of beads 8, that is, on and between a first bead 8 and a second bead 8. The carcass 10 of the tire 2 can have a radial structure.

The carcass 10 can include at least one carcass ply 42. The carcass 10 of the tire 2 can include two carcass plies 42. A first carcass ply 42a and a second carcass ply 42b can be turned up around the respective beads 8.

The first carcass ply 42a can include a ply body 48a and a pair of turned-up portions 50a. The ply body 48a can extend between the pair of beads 8. Each turned-up portion 50a can be connected to the ply body 48a and turned up around the bead 8 from the inner side toward the outer side in the axial direction.

The second carcass ply 42b can include a ply body 48b and a pair of turned-up portions 50b. The ply body 48b can extend between the pair of beads 8. Each turned-up portion 50b can be connected to the ply body 48b and turned up around the bead 8 from the inner side toward the outer side in the axial direction.

In the tire 2 shown in FIG. 1, an end of the turned-up portion 50b of the second carcass ply 42b can be covered with the turned-up portion 50a of the first carcass ply 42a. The end of the turned-up portion 50b can be located radially inward of the maximum width position PW, and an end of the turned-up portion 50a can be located radially outward of the maximum width position PW.

Each carcass ply 42 can include a large number of carcass cords aligned with each other. These carcass cords can be covered with a topping rubber. Each carcass cord can intersect the equator plane CL. The carcass cord can be a cord formed from a polyester fiber (polyester cord), as an example. The polyester cord can have higher stiffness than cords formed from a nylon fiber and a rayon fiber, for instance. The carcass 10 can effectively increase the stiffness of the tire 2.

The belt 12 can include three belt plies 44. The belt 12 may be composed of two belt plies 44, or may be composed of four belt plies 44, as examples.

The three belt plies 44 can be or include a first belt ply 44A, a second belt ply 44B, and a third belt ply 44C. These belt plies 44 can be aligned in the radial direction.

Of the three belt plies 44, the first belt ply 44A can be located on the innermost side in the radial direction, the second belt ply 44B can have the largest width, and the third belt ply 44C can have the smallest width.

Each belt ply 44 can include a relatively large number of belt cords aligned with each other. Each belt cord can be tilted relative to the equator plane CL. The belt cord can be a steel cord, as an example.

The band 14 can be located between the tread 4 and the belt 12 in the radial direction. The band 14 can be stacked on the belt 12.

According to one or more embodiments, the band 14 can include a helically wound band cord. Additionally or alternatively, the band cord can be covered with a topping rubber. The band cord can extend in or substantially in the circumferential direction. Specifically, an angle of the band cord with respect to the circumferential direction can be not greater than 5°. According to one or more embodiments, the band 14 can have a jointless structure. A cord formed from an organic fiber may be used as the band cord. Examples of the organic fiber include nylon fibers, rayon fibers, polyester fibers, and aramid fibers.

The band 14 of the tire 2 can include two full bands 46. According to one or more embodiments of the present disclosure, the two full bands 46 can cover the entirety of the belt 12 from the radially outer side.

The band 14 may be composed of one full band 46, according to one or more embodiments of the present disclosure. Additionally or alternatively, the band 14 may be composed of a pair of edge bands arranged so as to be spaced apart from each other in the axial direction with the equator plane CL therebetween. Additionally or alternatively, the band 14 may be composed of a full band 46 and a pair of edge bands.

Each chafer 16 can be located radially inward of the bead 8. The chafer 16 can come into contact with a seat of the rim R. The chafer 16 can be formed from a crosslinked rubber for which wear resistance is taken into consideration.

Each insulation 18 can be located axially inward of the sidewall 34. The insulation 18 can be stacked on the ply body 48b. An outer end of the insulation 18 can be located axially inward of an end of the belt 12, and can be located between the ply body 48b and the first belt ply 44A (i.e., between the carcass 10 and the belt 12). An inner end of the insulation 18 can be located radially inward of the outer end PA of the apex 40, and can be located between the ply body 48b and the apex 40. The insulation 18 can be formed from a crosslinked rubber.

The inner liner 20 can be located inward of the carcass 10. The inner liner 20 can be joined to the inner surface of the carcass 10 via an insulation formed from a crosslinked rubber. The inner liner 20 can form the inner surface USF of the tire 2. The inner liner 20 can be formed from a crosslinked rubber that has an excellent air blocking property. The inner liner 20 can serve to maintain the internal pressure of the tire 2.

Each reinforcing rubber layer 22 can be located axially outward of the bead 8. The reinforcing rubber layer 22 can be located between the turned-up portion 50a of the first carcass ply 42a and the protective rubber layer 6. The reinforcing rubber layer 22 can be in contact with the turned-up portion 50a at an inner surface thereof. The reinforcing rubber layer 22 can be in contact with the protective rubber layer 6 at an outer surface thereof.

The outer end PA of the above-described apex 40 can be located between an outer end PRS and an inner end PRU of the reinforcing rubber layer 22 in the radial direction. The outer end PRS of the reinforcing rubber layer 22 can be located radially inward of the end of the turned-up portion 50b of the second carcass ply 42b.

In FIG. 1, a position indicated by reference character PF can be regarded as a position, on the side surface 32, corresponding to a radially outer end of a contact surface between the rim R and the side surface 32. According to one or more embodiments of the present disclosure, the position PF can be regarded as a rim contact end. The inner end PRU of the reinforcing rubber layer 22 can be located radially inward of the rim contact end PF.

A length indicated by reference character HR can be regarded as the distance in the radial direction from the bead base line BBL to the outer end PRS of the reinforcing rubber layer 22. The distance HR in the radial direction can also be referred to as radial height of the reinforcing rubber layer 22.

The ratio (HR/HW) of the radial height HR of the reinforcing rubber layer 22 to the radial height HW of the maximum width position PW can be not less than 0.55 and not greater than 0.70, for instance.

The reinforcing rubber layer 22 can be formed from a hard crosslinked rubber. A complex elastic modulus of the reinforcing rubber layer 22 can be not less than 60 MPa and not greater than 90 MPa, for instance. The reinforcing rubber layer 22 of the tire 2 shown in FIG. 1 can be formed from a crosslinked rubber that is the same as the crosslinked rubber forming the apex 40.

The cross-sectional shape of the reinforcing rubber layer 22 in the meridian cross-section is not particularly limited. The cross-sectional shape may be shaped such that the reinforcing rubber layer 22 has a uniform thickness as a whole, or the cross-sectional shape may be shaped such that the reinforcing rubber layer 22 is thick at a center portion and becomes gradually thinner from the center portion toward the outer side, as examples.

From the viewpoint of easily controlling the thickness, the reinforcing rubber layer 22 can be formed using a rubber sheet 52.

The reinforcing rubber layer 22 shown in FIG. 1 can be composed of two rubber sheets 52, but the number of rubber sheets 52 forming the reinforcing rubber layer 22 is not particularly limited. The reinforcing rubber layer 22 may be composed of one rubber sheet 52, or may be composed of three or more rubber sheets 52.

In the case where the reinforcing rubber layer 22 is composed of one rubber sheet 52, from the viewpoint of suppressing concentration of strain, end portions of the rubber sheet 52 corresponding to the outer end PRS and the inner end PRU of the reinforcing rubber layer 22 can have a tapered shape. In the case where the reinforcing rubber layer 22 is composed of two or more rubber sheets 52, the reinforcing rubber layer 22 can be formed by stacking a narrower rubber sheet 52n on the outer side of a wider rubber sheet 52w as shown in FIG. 1. In this case, the narrower rubber sheet 52n can be stacked on the wider rubber sheet 52w such that an outer end of the narrower rubber sheet 52n is located radially inward of an outer end of the wider rubber sheet 52w, and an inner end of the narrower rubber sheet 52n is located radially outward of an inner end of the wider rubber sheet 52w.

According to one or more embodiments of the present disclosure, the reinforcing rubber layer 22 can be harder than the sidewall 34 and the clinch 36 included in the protective rubber layer 6. Therefore, if the thickness of the protective rubber layer 6 is set as in a conventional tire in which no reinforcing rubber layer 22 is provided, the stiffness of a rubber layer located outward of the carcass 10 can be increased at a portion including the reinforcing rubber layer 22. Therefore, there may be a concern that the difference between a portion having larger surface strain and a portion having smaller surface strain may be increased as compared to that in the conventional tire. It can therefore be assumed that strain is concentrated in a radially outer portion from a center position RC of the reinforcing rubber layer 22, and in this case, durability may be decreased.

Here, the rubber layer located outward of the carcass 10 can mean a component including a component located outward of the carcass 10 in a sidewall portion and formed from a crosslinked rubber. In the tire 2 shown in FIG. 1, a component composed of the protective rubber layer 6 and the reinforcing rubber layer 22 can be regarded as the rubber layer located outward of the carcass 10.

However, in the tire 2, the thickness of the protective rubber layer 6 in a zone from the rim contact end PF to the outer end PRS of the reinforcing rubber layer 22 can be relatively small at a center portion in the radial direction of the reinforcing rubber layer 22 and can be larger at the other portion. In other words, the protective rubber layer 6 in this zone can have a minimum thickness at the center portion in the radial direction of the reinforcing rubber layer 22.

Therefore, the stiffness of the rubber layer located outward of the carcass 10 can be inhibited from being increased at the portion including the reinforcing rubber layer 22. Strain generated at the side surface 32 of the tire 2 can be effectively dispersed, so that concertation of strain on a specific portion can be suppressed. The tire 2 can have improved durability. The volume of the protective rubber layer 6 can be reduced, so that the tire 2 can have a reduced mass.

The tire 2 can improve the degree of achievement of both durability and mass reduction.

In FIG. 2, a length indicated by reference character MR can be regarded as the distance in the radial direction from the inner end PRU to the outer end PRS of the reinforcing rubber layer 22. The distance MR can be regarded as the radial length of the reinforcing rubber layer 22.

A solid line LM extending in the axial direction can be regarded as a straight line indicating the center of the radial length MR of the reinforcing rubber layer 22. A position indicated by reference character RC can be regarded as the point of intersection of the straight line LM and the outer surface of the reinforcing rubber layer 22. According to one or more embodiments of the present disclosure, the point of intersection RC can be the center position in the radial direction of the reinforcing rubber layer 22. A straight line indicated by reference character LC can be a normal line that passes through the center position RC in the radial direction of the reinforcing rubber layer 22 and that is normal to the side surface 32. The normal line LC can also be referred to as reference line.

A length indicated by reference character M1 can be the distance in the radial direction from a position, on the outer surface of the reinforcing rubber layer 22, indicated by reference character R1 to the inner end PRU of the reinforcing rubber layer 22. According to one or more embodiments of the present disclosure, the ratio of the distance M1 in the radial direction to the radial length MR of the reinforcing rubber layer 22 can be 40%, as an example. A dotted line L1 can be regarded as a straight line that passes through the position R1 and that is parallel to the normal line LC. The dotted line L1 can also be referred to as first boundary line. The first boundary line L1 can be regarded as a straight line that is parallel to the reference line LC and that passes through the position, on the outer surface of the reinforcing rubber layer 22, at which the distance M1 in the radial direction from the inner end PRU of the reinforcing rubber layer 22 is, for instance, 40% of the radial length MR of the reinforcing rubber layer 22.

A length indicated by reference character M2 can be the distance in the radial direction from a position, on the outer surface of the reinforcing rubber layer 22, indicated by reference character R2 to the inner end PRU of the reinforcing rubber layer 22. According to one or more embodiments of the present disclosure, the ratio of the distance M2 in the radial direction to the radial length MR of the reinforcing rubber layer 22 can be 45%, as an example. A dotted line L2 can be a straight line that passes through the position R2 and that is parallel to the normal line LC. The dotted line L2 can also be referred to as second boundary line. The second boundary line L2 can be a straight line that is parallel to the reference line LC and that passes through the position, on the outer surface of the reinforcing rubber layer 22, at which the distance M2 in the radial direction from the inner end PRU of the reinforcing rubber layer 22 is, for instance, 45% of the radial length MR of the reinforcing rubber layer 22.

A length indicated by reference character M3 can be regarded as the distance in the radial direction from a position, on the outer surface of the reinforcing rubber layer 22, indicated by reference character R3 to the inner end PRU of the reinforcing rubber layer 22. According to one or more embodiments of the present disclosure, the ratio of the distance M3 in the radial direction to the radial length MR of the reinforcing rubber layer 22 can be 55%, for instance. A dotted line L3 can be regarded as a straight line that passes through the position R3 and that is parallel to the normal line LC. The dotted line L3 can also be referred to as third boundary line. The third boundary line L3 can be regarded as a straight line that is parallel to the reference line LC and that passes through the position, on the outer surface of the reinforcing rubber layer 22, at which the distance M3 in the radial direction from the inner end PRU of the reinforcing rubber layer 22 is, for instance, 55% of the radial length MR of the reinforcing rubber layer 22.

A length indicated by reference character M4 can be the distance in the radial direction from a position, on the outer surface of the reinforcing rubber layer 22, indicated by reference character R4 to the inner end PRU of the reinforcing rubber layer 22. According to one or more embodiments of the present disclosure, the ratio of the distance M4 in the radial direction to the radial length MR of the reinforcing rubber layer 22 can be 60%, as an example. A dotted line L4 can be a straight line that passes through the position R4 and that is parallel to the normal line LC. The dotted line L4 can also be referred to as fourth boundary line. The fourth boundary line L4 can be a straight line that is parallel to the reference line LC and that passes through the position, on the outer surface of the reinforcing rubber layer 22, at which the distance M4 in the radial direction from the inner end PRU of the reinforcing rubber layer 22 is, for instance, 60% of the radial length MR of the reinforcing rubber layer 22.

According to one or more embodiments of the present disclosure, a zone between the first boundary line L1 and the fourth boundary line L4 can also be referred to as standard zone ZN. A zone between the second boundary line L2 and the third boundary line L3 can also be referred to as special zone ZS.

As described above, the protective rubber layer 6 can have a minimum thickness at the center portion in the radial direction of the reinforcing rubber layer 22. From the viewpoint of being able to effectively improve the degree of achievement of both durability and mass reduction, the protective rubber layer 6 can have a minimum thickness in the standard zone ZN. According to one or more embodiments of the present disclosure the protective rubber layer 6 can have a minimum thickness in the special zone ZS. And further according to one or more embodiments, the protective rubber layer 6 further can have a minimum thickness at the center position RC in the radial direction of the reinforcing rubber layer 22.

Figure 3:
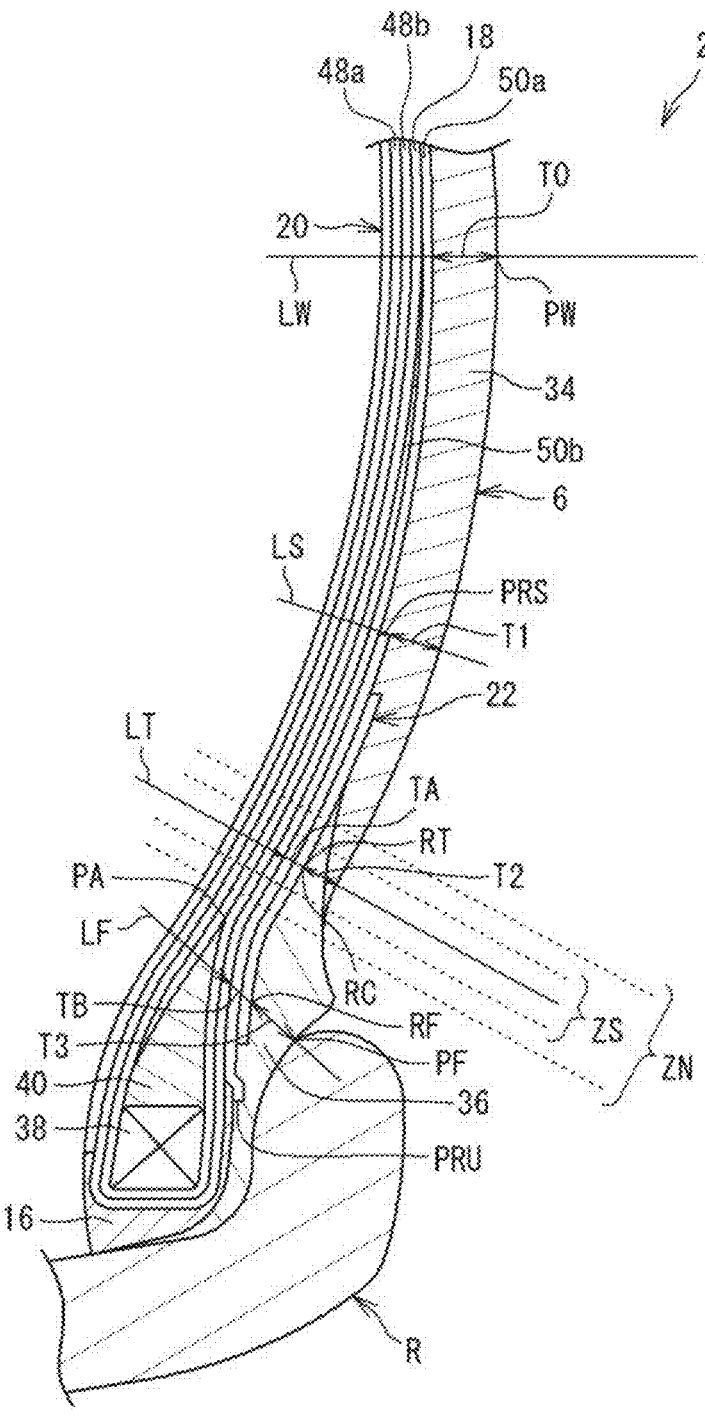
FIG. 3 is a cross-sectional view showing the bead portion of the tire.

FIG. 3 shows the bead portion in FIG. 1. In FIG. 3, a position indicated by reference character RT can be regarded as a position on the outer surface of the reinforcing rubber layer 22. A straight line indicated by reference character LT can be regarded as a normal line that passes through the position RT and that is normal to the side surface 32. A length indicated by reference character T2 can be regarded as the thickness of the protective rubber layer 6 measured along the normal line LT. The protective rubber layer 6 of the tire 2 shown in FIG. 3 can have the minimum thickness T2 at the position RT. The position RT can be regarded as a position at which the protective rubber layer 6 has the minimum thickness T2. In the case where the protective rubber layer 6 has the minimum thickness T2 at the center position RC in the radial direction of the reinforcing rubber layer 22, the position RT at which the protective rubber layer 6 has the minimum thickness T2 can coincide with the center position RC in the radial direction of the reinforcing rubber layer 22, and the normal line LT can coincide with the normal line LC.

In FIG. 3, a length indicated by reference character T0 can be regarded as the thickness of the protective rubber layer 6 measured along a normal line LW that passes through the maximum width position PW and that is normal to the side surface 32. A length indicated by reference character T1 can be regarded as the thickness of the protective rubber layer 6 measured along a normal line LS that passes through the outer end PRS of the reinforcing rubber layer 22 and that is normal to the side surface 32. A length indicated by reference character TA can be regarded as the thickness of the reinforcing rubber layer 22 measured along the normal line LT. A length indicated by reference character T3 can be regarded as the thickness of the protective rubber layer 6 measured along a normal line LF that is normal to the side surface 32 at the rim contact end PF. A length indicated by reference character TB can be regarded as the thickness of the reinforcing rubber layer 22 measured along the normal line LF.

The protective rubber layer 6 can have the thickness T0 (hereinafter, referred to as reference thickness T0) at the maximum width position PW, can have the thickness T1 (hereinafter, referred to as outer end thickness T1) at the outer end PRS of the reinforcing rubber layer 22, can have the minimum thickness T2 at the center portion in the radial direction of the reinforcing rubber layer 22, and/or can have the thickness T3 (hereinafter, referred to as contact thickness T3) at the rim contact end PF.

The reinforcing rubber layer 22 can have the thickness TA (hereinafter, referred to as intermediate thickness TA) at the position RT at which the protective rubber layer 6 has the minimum thickness T2, and/or can have the thickness TB (hereinafter, referred to as contact thickness TB) at the rim contact end PF.

According to one or more embodiments, in the tire 2, the minimum thickness T2 of the protective rubber layer 6 can be smaller than the outer end thickness T1, the outer end thickness T1 can be the same as or similar to the reference thickness T0, and a total thickness T3B of the contact thickness T3 and the contact thickness TB can be larger than the reference thickness T0. Accordingly, the stiffness of the rubber layer located outward of the carcass 10 can be effectively inhibited from being increased at the portion including the reinforcing rubber layer 22. Strain generated at the side surface 32 of the tire 2 can be effectively dispersed, so that concentration of strain on a specific portion is suppressed. The tire 2 can have improved durability. The volume of the protective rubber layer 6 can be reduced, so that the tire 2 can have a reduced mass.

According to one or more embodiments of the present disclosure, the fact that the outer end thickness T1 can be the same as or similar to the reference thickness T0 can mean that the ratio (T1/T0) of the outer end thickness T1 to the reference thickness T0 is in the range of not less than 0.95 and not greater than 1.05, for instance.

In the tire 2, the ratio (T2/T1) of the minimum thickness T2 to the outer end thickness T1 can be not less than 0.5, as an example. Accordingly, the thickness of the protective rubber layer 6 at the center portion in the radial direction of the reinforcing rubber layer 22 can be appropriately maintained. The influence of the thinness of the protective rubber layer 6 at the center portion in the radial direction of the reinforcing rubber layer 22, on stiffness, can be effectively suppressed. The entirety of the protective rubber layer 6 can have the stiffness required to maintain the shape of the tire 2. The tire 2 can have improved durability. From this viewpoint, the ratio (T2/T1) can be not less than 0.6, for instance, not less than 0.7. From the viewpoint of being able to effectively reduce the mass of the tire 2 and being able to effectively disperse strain generated at the side surface 32 of the tire 2, the ratio (T2/T1) can be not greater than 0.9, for instance, not greater than 0.8.

In the tire 2, the ratio (T3B/T0) of the total thickness T3B to the reference thickness T0 can be not less than 3.0 and not greater than 5.0, for instance.

When the ratio (T3B/T0) is set to be not less than 3.0, the reinforcing rubber layer 22 and the protective rubber layer 6 at the rim contact end PF can contribute to increasing the stiffness of the bead portion. The durability of the tire 2 can be further enhanced. From this viewpoint, the ratio (T3B/T0) can be not less than 3.3.

When the ratio (T3B/T0) is set to be not greater than 5.0, the volume of the rubber layer located outward of the carcass 10 can be appropriately maintained. The influence of the rubber layer on mass can be suppressed. From this viewpoint, the ratio (T3B/T0) can be not greater than 4.5, for instance, not greater than 4.0.

From the viewpoint that the tire 2 can have further improved durability while achieving mass reduction, the ratio (T2/T1) of the minimum thickness T2 to the outer end thickness T1 can be not less than 0.5, and the ratio (T3B/T0) of the total thickness T3B to the reference thickness T0 can be not less than 3.0 and not greater than 5.0.

From the viewpoint of being able to ensure the stiffness at the rim contact end PF, the ratio (T3/T1) of the contact thickness T3 to the outer end thickness T1 of the protective rubber layer 6 can be not less than 2.0.

From the viewpoint of being able to suppress the influence of the protective rubber layer 6 on mass, the ratio (T3/T1) can be not greater than 2.5.

In the tire 2, the ratio (T2A/T1) of a total thickness T2A of the minimum thickness T2 and the intermediate thickness TA to the outer end thickness T1 can be not less than 0.5 and not greater than 2.0, for instance.

When the ratio (T2A/T1) is set to be not less than 0.5, the rubber layer located outward of the carcass 10 can be inhibited from being excessively thin at the center portion in the radial direction of the reinforcing rubber layer 22. The rubber layer can have the stiffness required to maintain the shape. In the tire 2, good durability can be maintained. From this viewpoint, the ratio (T2A/T1) can be not less than 1.0, for instance, not less than 1.5.

When the ratio (T2A/T1) is set to be not greater than 2.0, the mass of the tire 2 can be effectively reduced, and strain generated at the side surface 32 of the tire 2 can be effectively dispersed. From this viewpoint, the ratio (T2A/T1) can be not greater than 1.8, for instance.

FIG. 4 shows a part of a contour line of the side surface 32 in the meridian cross-section of the tire 2.

The contour line of the side surface 32 shown in FIG. 4 can be obtained by measuring the outer surface shape of the tire 2 in the reference state, for example, using a displacement sensor. In the case where a decoration is present on the side surface 32, the contour line can be represented on the assumption that this decoration is not present. A position indicated by reference character PWp can be regarded as a maximum width position in the tire 2 in the reference state.

The contour line of the side surface 32 can be formed by combining a plurality of arcs and, if necessary, connecting the arcs by a straight line.

As shown in FIG. 4, the contour line of the side surface 32 can have an outwardly bulging shape around the maximum width position PWp, and can have an inwardly recessed shape at a portion near the rim R.

Specifically, this contour line can include a first curved portion 54 which is located radially outward of the maximum width position PWp and which can bulge outwardly, a second curved portion 56 which is located radially inward of the maximum width position PWp and which can bulge outwardly, and an inversely curved portion 58 which is located radially inward of the second curved portion 56 and which can be recessed inwardly. The inversely curved portion 58 can be located between the rim R and the second curved portion 56.

According to one or more embodiments of the present disclosure, outwardly bulging can mean a shape curved from the inner surface side to the outer surface side of the tire, and inwardly recessed can mean a shape curved from the outer surface side to the inner surface side of the tire.

The first curved portion 54, the second curved portion 56, and the inversely curved portion 58 can each be represented by an arc.

In FIG. 4, an arrow indicated by reference character Rj can represent the radius of the arc of the first curved portion 54. This arc can have a center on a straight line that passes through the maximum width position PWp and that extends in the axial direction.

An arrow indicated by reference character Rk can represent the radius of the arc of the second curved portion 56. This arc can have a center on the straight line that passes through the maximum width position PWp and that extends in the axial direction.

The arc of the first curved portion 54 and the arc of the second curved portion 56 can be tangent to each other at the maximum width position PWp, according to one or more embodiments of the present disclosure.

An arrow indicated by reference character Rr can represent the radius of the arc of the inversely curved portion 58. The center of this arc can be located outward of the side surface 32.

A position indicated by reference character Pb can be regarded as the boundary between the inversely curved portion 58 and the second curved portion 56. In the tire 2, the arc of the inversely curved portion 58 and the arc of the second curved portion 56 can be tangent to each other at the boundary Pb, according to one or more embodiments of the present disclosure. The arc of the inversely curved portion 58 and the arc of the second curved portion 56 may be connected by a straight line, or may be connected by one or more outwardly bulging arcs. In the case where the arc of the inversely curved portion 58 and the arc of the second curved portion 56 are connected via a straight line or an arc, the boundary Pb can be represented by an end of the arc of the inversely curved portion 58.

In the tire 2, according to one or more embodiments of the present disclosure, the radius Rr of the arc representing the inversely curved portion 58 can be smaller than the radius Rj of the arc representing the first curved portion 54. In other words, the ratio (Rr/Rj) of the radius Rr of the arc representing the inversely curved portion 58, to the radius Rj of the arc representing the first curved portion 54, can be less than 1.00. Accordingly, the protective rubber layer 6 in the zone from the rim contact end PF to the outer end PRS of the reinforcing rubber layer 22 can be formed such that the thickness thereof is relatively small at the center portion in the radial direction of the reinforcing rubber layer 22 and is relatively large at the other portion. The stiffness of the rubber layer located outward of the carcass 10 can be inhibited from being increased at the portion including the reinforcing rubber layer 22, for instance, so that strain generated at the side surface 32 of the tire 2 is effectively dispersed. Concentration of strain on a specific portion can be suppressed, for instance, so that the tire 2 can have improved durability. The volume of the protective rubber layer 6 can be reduced, so that the tire 2 can have a reduced mass. From this viewpoint, the ratio (Rr/Rj) can be not greater than 0.90, for instance, not greater than 0.80.

In the tire 2, the ratio (Rr/Rj) can be not less than 0.50. Accordingly, when the tire 2 is filled with air and the internal pressure thereof is adjusted to a prescribed internal pressure, surface strain generated at the inversely curved portion 58 can be inhibited from being excessively increased. In the tire 2, good durability can be maintained. From this viewpoint, the ratio (Rr/Rj) can be not less than 0.56.

In FIG. 4, a length indicated by reference character HWp can be regarded as the distance in the radial direction from the bead base line BBL to the maximum width position PWp. The distance HWp in the radial direction can also be referred to as radial height of the maximum width position PWp. A length indicated by reference character Hb can be regarded as the distance in the radial direction from the bead base line BBL to the boundary Pb.

In the tire 2, from the viewpoint that the inversely curved portion 58 can effectively contribute to mass reduction and improvement of durability, the ratio (Hb/PWp) of the distance Hb in the radial direction to the radial height HWp of the maximum width position PWp can be not less than 0.30 and not greater than 0.45, for instance.

In view of the foregoing, according to one or more embodiments the present disclosure, the tire 2 that can improve the degree of achievement of both durability and mass reduction, can be obtained.

EXAMPLES

Hereinafter, embodiments of the present disclosure will be described in further detail by means of examples, etc., but embodiments the present disclosure are not limited to these examples.

Examples 1 and 2 and Comparative Examples 1 to 3

Small truck tires (tire size=225/85R16) having the basic structure shown in FIG. 1 and having specifications shown in Table 1 below were obtained.

The reference thickness T0, the outer end thickness T1, the minimum thickness T2, the total thickness T3B of the contact thickness T3 and the contact thickness TB, and the intermediate thickness TA were set as shown in Table 1 below. As for the contour line of each side surface, the radius Rj of the first curved portion was set as shown in Table 1. No inversely curved portion is provided in the contour lines of Examples 1 and 2 and Comparative Examples 1 to 3.

Examples 3 and 4

Tires of Examples 3 and 4 were obtained in the same manner as Example 1, except that an inversely curved portion was provided in the contour line of the side surface. The radius Rr of the arc of the inversely curved portion of each of Examples 3 and 4 is as shown in Table 1 below.

[Durability]

A test tire was fitted onto a rim (size=6.0 J) and inflated with air to adjust the internal pressure thereof to a normal internal pressure. The tire was mounted to a drum type tire testing machine. A vertical load of 19.8 kN was applied to the tire, and the tire was caused to run on a drum (radius=1.7 m) at a speed of 80 km/h. The running distance was measured until damage to the tire was observed. The results are shown as indexes in Table 1 below with the result of Comparative Example 1 being regarded as 100. The higher the value is, the less likely damage occurs and the better the durability is.

[Mass Reduction]

The mass of the protective rubber layer and the reinforcing rubber layer located outward of the carcass was measured. The results are shown as indexes in Table 1 below with the result of Comparative Example 1 being regarded as 100. The higher the value is, the smaller the mass is.

[Degree of Achievement]

In order to confirm the degree of achievement of both durability and mass reduction, the total value of the indexes of durability and mass reduction was obtained. The results are shown in Table 1 below. The higher the value is, the more the degree of achievement of both durability and mass reduction is improved.

TABLE 1

| | Comp. Ex. 1 | Comp. Ex. 2 | Comp. Ex. 3 | Ex. 1 | Ex. 2 | Ex. 3 | Ex. 4 |
|---|---|---|---|---|---|---|---|
| T0 [mm] | 3.0 | 3.0 | 4.0 | 3.0 | 3.0 | 3.0 | 3.0 |
| T1 [mm] | 3.0 | 4.0 | 3.0 | 3.0 | 3.0 | 3.0 | 3.0 |
| T2 [mm] | 4.0 | 4.0 | 3.0 | 2.5 | 2.5 | 2.5 | 2.5 |
| T3B [mm] | 10 | 10 | 10 | 10 | 10 | 10 | 10 |
| TA [mm] | 3.0 | 3.0 | 3.0 | 3.0 | 4.0 | 3.0 | 3.0 |
| T2/T1 [—] | 1.3 | 1.0 | 1.0 | 0.8 | 0.8 | 0.8 | 0.8 |
| T1/T0 [—] | 1.0 | 1.3 | 0.8 | 1.0 | 1.0 | 1.0 | 1.0 |
| T3B/T0 [—] | 3.3 | 3.3 | 2.5 | 3.3 | 3.3 | 3.3 | 3.3 |
| T2A/T1 [—] | 2.3 | 1.8 | 2.0 | 1.8 | 2.2 | 1.8 | 1.8 |
| Rj [mm] | 160 | 160 | 160 | 160 | 160 | 160 | 160 |
| Rr [mm] | — | — | — | — | — | 40 | 90 |
| Rr/Rj [—] | — | — | — | — | — | 0.25 | 0.56 |
| Durability | 100 | 95 | 95 | 110 | 110 | 110 | 110 |
| Mass reduction | 100 | 95 | 95 | 110 | 105 | 115 | 113 |
| Degree of achievement | 200 | 190 | 190 | 220 | 215 | 225 | 223 |

As shown in Table 1, it is confirmed that the degree of achievement of both durability and mass reduction can be improved in each Example. From the evaluation results, advantages of one or more embodiments of the present disclosure are clear.

The above-described technology capable of improving the degree of achievement of both durability and mass reduction can be applied to various tires.

What is claimed is:

1. A tire comprising:

a pair of beads;

a carcass extending on and between the pair of beads;

a pair of protective rubber layers each axially outward of the carcass and forming a side surface of the tire; and a pair of reinforcing rubber layers, per side of the tire, each axially outward of the bead, wherein the carcass includes a carcass ply including a carcass cord, the carcass ply includes:

a ply body extending between the pair of beads, and a pair of turned-up portions each connected to the ply body and turned up around a corresponding one of the beads of the pair of beads, per side of the tire, each said pair of the reinforcing rubber layers is between a corresponding one of the turned-up portions and a corresponding one of the protective rubber layers, per side of the tire, each of the beads includes a core and an apex radially outward of the core, an outer end of the apex being between an outer end and an inner end of the corresponding pair of reinforcing rubber layers in a radial direction, a thickness of the corresponding protective rubber layer in a zone from a rim contact end to the outer end of the corresponding pair of reinforcing rubber layers is small at a center portion in the radial direction of the corresponding pair of reinforcing rubber layers and compared to at another portion, the corresponding protective rubber layer has a reference thickness at a maximum width position, has an outer end thickness at the outer end of the corresponding pair of reinforcing rubber layers, has a thickness at the center portion in the radial direction of the corresponding pair of reinforcing rubber layers less than the reference thickness, and has a contact thickness at the rim contact end, the corresponding pair of reinforcing rubber layers has a contact thickness at the rim contact end, the thickness of the corresponding protective rubber layer at the center portion is smaller than the outer end thickness, the thickness of the corresponding protective rubber layer at the center portion is less than the contact thickness of the corresponding protective rubber layer, a total thickness of the contact thickness of the corresponding protective rubber layer and the contact thickness of the corresponding pair of reinforcing rubber layers is larger than the reference thickness, a first ratio of the thickness of the corresponding protective rubber layer at the center portion to the outer end thickness is not less than 0.5, and a second ratio of the total thickness to the reference thickness is not less than 3.0 and not greater than 5.0.

2. The tire according to claim 1, wherein the corresponding pair of reinforcing rubber layers has an intermediate thickness at a position at which the corresponding protective rubber layer has the thickness of the corresponding protective rubber layer at the center portion, and a third ratio of a total thickness of the thickness of the corresponding protective rubber layer at the center portion and the intermediate thickness to the outer end thickness is not less than 0.5 and not greater than 2.0.

3. The tire according to claim 1, wherein in a reference state where the tire is fitted on a standardized rim and an internal pressure of the tire is adjusted to 30 kPa, a contour line of the side surface includes a first curved portion radially outward of the maximum width position and bulging outwardly, a second curved portion radially inward of the maximum width position and bulging outwardly, and an inversely curved portion radially inward of the second curved portion and recessed inwardly, the first curved portion, the second curved portion, and the inversely curved portion are each represented by an arc, a radius Rr of the arc representing the inversely curved portion is smaller than a radius of the arc representing the first curved portion, and a ratio of the radius of the arc representing the inversely curved portion, to the radius of the arc representing the first curved portion, is not less than 0.50.

4. The tire according to claim 1, wherein the thickness of the corresponding protective rubber layer increases in a direction going away from a clinch of the tire.

5. The tire according to claim 1, wherein each of the reinforcing rubber layers, per pair, has a thickness that is substantially uniform.

6. The tire according to claim 1, wherein the reinforcing rubber layers, per pair, are stacked relative to each other in a radial direction.

7. The tire according to claim 1, wherein a radially outermost reinforcing rubber layer of the pair of reinforcing rubber layers has a length less a length of a radially innermost reinforcing rubber layer of the pair of reinforcing rubber layers.

8. A tire comprising:

a pair of beads;

a carcass extending on and between the pair of beads;

a pair of protective rubber layers each axially outward of the carcass and forming a side surface of the tire; and a pair of reinforcing rubber layers each axially outward of the bead, wherein the carcass includes a carcass ply including a carcass cord, the carcass ply includes:

a ply body extending between the pair of beads, and a pair of turned-up portions each connected to the ply body and turned up around the a corresponding one of the beads of the pair of beads, per side of the tire, each said pair of the reinforcing rubber layers is between a corresponding one of the turned-up portions and a corresponding one of the protective rubber layers, per side of the tire, each of the beads includes a core and an apex radially outward of the core, an outer end of the apex being between an outer end and an inner end of the corresponding pair of reinforcing rubber layers in a radial direction, a thickness of the corresponding protective rubber layer in a zone from a rim contact end to the outer end of the corresponding pair of reinforcing rubber layers is small at a center portion in the radial direction of the corresponding pair of reinforcing rubber layers and compared to at another portion, the corresponding protective rubber layer has a reference thickness at a maximum width position, has an outer end thickness at the outer end of the corresponding pair of reinforcing rubber layers, has a thickness at the center portion in the radial direction of the corresponding pair of reinforcing rubber layers less than the reference thickness, and has a contact thickness at the rim contact end, the corresponding pair of reinforcing rubber layers has a contact thickness at the rim contact end, the thickness of the corresponding protective rubber layer at the center portion is smaller than the outer end thickness, the thickness of the corresponding protective rubber layer at the center portion is less than the contact thickness of the corresponding protective rubber layer, a total thickness of the contact thickness of the corresponding protective rubber layer and the contact thickness of the corresponding pair of reinforcing rubber layers is larger than the reference thickness, the corresponding pair of reinforcing rubber layers has an intermediate thickness at a position at which the corresponding protective rubber layer has the thickness of the corresponding protective rubber layer at the center portion, and a third ratio of a total thickness of the thickness of the corresponding protective rubber layer at the center portion and the intermediate thickness to the outer end thickness is not less than 0.5 and not greater than 2.0.

9. The tire according to claim 8, wherein in a reference state where the tire is fitted on a standardized rim and an internal pressure of the tire is adjusted to 30 kPa, a contour line of the side surface includes a first curved portion radially outward of the maximum width position and bulging outwardly, a second curved portion radially inward of the maximum width position and bulging outwardly, and an inversely curved portion radially inward of the second curved portion and recessed inwardly, the first curved portion, the second curved portion, and the inversely curved portion are each represented by an arc, a radius Rr of the arc representing the inversely curved portion is smaller than a radius of the arc representing the first curved portion, and a ratio of the radius of the arc representing the inversely curved portion, to the radius of the arc representing the first curved portion, is not less than 0.50.

10. The tire according to claim 8, wherein the thickness of the corresponding protective rubber layer increases in a direction going away from a clinch of the tire.

11. The tire according to claim 8, wherein each of the reinforcing rubber layers, per pair, has a thickness that is substantially uniform.

12. The tire according to claim 8, wherein the reinforcing rubber layers, per pair, are stacked relative to each other in a radial direction.

13. The tire according to claim 8, wherein a radially outermost reinforcing rubber layer of the pair of reinforcing rubber layers has a length less a length of a radially innermost reinforcing rubber layer of the pair of reinforcing rubber layers.

14. A tire comprising:

a pair of beads;

a carcass extending on and between the pair of beads;

a pair of protective rubber layers each axially outward of the carcass and forming a side surface of the tire; and a pair of reinforcing rubber layers, per side of the tire, each axially outward of the bead, wherein the carcass includes a carcass ply including a carcass cord, the carcass ply includes:

a ply body extending between the pair of beads, and a pair of turned-up portions each connected to the ply body and turned up around a corresponding one of the beads of the pair of beads, per side of the tire, each said pair of the reinforcing rubber layers is between a corresponding one of the turned-up portions and a corresponding one of the protective rubber layers, per side of the tire, each of the beads includes a core and an apex radially outward of the core, an outer end of the apex being between an outer end and an inner end of the corresponding pair of reinforcing rubber layers in a radial direction, a thickness of the corresponding protective rubber layer in a zone from a rim contact end to the outer end of the corresponding pair of reinforcing rubber layers is small at a center portion in the radial direction of the corresponding pair of reinforcing rubber layers and compared to at another portion, the corresponding protective rubber layer has a reference thickness at a maximum width position, has an outer end thickness at the outer end of the corresponding pair of reinforcing rubber layers, has a thickness at the center portion in the radial direction of the corresponding pair of reinforcing rubber layers less than the reference thickness, and has a contact thickness at the rim contact end, the corresponding pair of reinforcing rubber layers has a contact thickness at the rim contact end, the thickness of the corresponding protective rubber layer at the center portion is smaller than the outer end thickness, the thickness of the corresponding protective rubber layer at the center portion is less than the contact thickness of the corresponding protective rubber layer, a total thickness of the contact thickness of the corresponding protective rubber layer and the contact thickness of the corresponding pair of reinforcing rubber layers is larger than the reference thickness, in a reference state where the tire is fitted on a standardized rim and an internal pressure of the tire is adjusted to 30 kPa, a contour line of the side surface includes a first curved portion radially outward of the maximum width position and bulging outwardly, a second curved portion radially inward of the maximum width position and bulging outwardly, and an inversely curved portion radially inward of the second curved portion and recessed inwardly, the first curved portion, the second curved portion, and the inversely curved portion are each represented by an arc, a radius Rr of the arc representing the inversely curved portion is smaller than a radius of the arc representing the first curved portion, a ratio of the radius of the arc representing the inversely curved portion, to the radius of the arc representing the first curved portion, is not less than 0.50, a first ratio of the thickness of the corresponding protective rubber layer at the center portion to the outer end thickness is not less than 0.5, a second ratio of the total thickness to the reference thickness is not less than 3.0 and not greater than 5.0, the corresponding pair of reinforcing rubber layers has an intermediate thickness at a position at which the corresponding protective rubber layer has the thickness of the corresponding protective rubber layer at the center portion, and a third ratio of a total thickness of the thickness of the corresponding protective rubber layer at the center portion and the intermediate thickness to the outer end thickness is not less than 0.5 and not greater than 2.0.

15. The tire according to claim 14, wherein the thickness of the corresponding protective rubber layer increases in a direction going away from a clinch of the tire.

16. The tire according to claim 14, wherein each of the reinforcing rubber layers, per pair, has a thickness that is substantially uniform.

* * * * *